United States Patent
Valvanne et al.

(10) Patent No.: US 9,398,105 B2
(45) Date of Patent: *Jul. 19, 2016

(54) METHOD FOR PROVIDING A THIRD PARTY SERVICE ASSOCIATED WITH A NETWORK-ACCESSIBLE SITE USING A SINGLE SCRIPTING APPROACH

(71) Applicant: Nosto Solutions Ltd, Helsinki (FI)

(72) Inventors: Juha Niilo Sakari Valvanne, Helsinki (FI); Antti Aleksanteri Pöyhönen, Vantaa (FI); Jani Markus Luostarinen, Helsinki (FI)

(73) Assignee: NOSTO SOLUTIONS LTD., Helsinki (FI)

( * ) Notice: Subject to any disclaimer, the term of this patent is extended or adjusted under 35 U.S.C. 154(b) by 91 days.

This patent is subject to a terminal disclaimer.

(21) Appl. No.: 14/255,733

(22) Filed: Apr. 17, 2014

(65) Prior Publication Data

US 2015/0052189 A1 Feb. 19, 2015

Related U.S. Application Data

(60) Provisional application No. 61/866,559, filed on Aug. 16, 2013.

(51) Int. Cl.
*H04L 29/08* (2006.01)

(52) U.S. Cl.
CPC .................. *H04L 67/22* (2013.01); *H04L 67/02* (2013.01); *H04L 67/20* (2013.01)

(58) Field of Classification Search
CPC ................................ H04L 12/24; H04L 67/22
See application file for complete search history.

(56) References Cited

U.S. PATENT DOCUMENTS

| | | | | |
|---|---|---|---|---|
| 2002/0065802 | A1* | 5/2002 | Uchiyama | G06F 17/30867 |
| 2006/0167860 | A1* | 7/2006 | Eliashberg | G06Q 30/06 |
| 2006/0253578 | A1* | 11/2006 | Dixon | G06Q 10/06 709/225 |
| 2008/0288303 | A1* | 11/2008 | Gray | G06Q 30/0185 705/7.29 |
| 2009/0216882 | A1 | 8/2009 | Britton et al. | |
| 2009/0292984 | A1* | 11/2009 | Bauchot | G06F 17/30896 715/234 |
| 2010/0070448 | A1* | 3/2010 | Omoigui | H01L 27/1463 706/47 |
| 2013/0304906 | A1* | 11/2013 | Yavilevich | H04L 67/22 709/224 |

FOREIGN PATENT DOCUMENTS

WO  2009009257  1/2009

* cited by examiner

*Primary Examiner* — Nicholas Taylor
*Assistant Examiner* — Sanjoy Roy
(74) *Attorney, Agent, or Firm* — Fasth Law Offices; Rolf Fasth

(57) ABSTRACT

The invention provides a method for providing a third party service associated with a network-accessible site. The method includes providing a client-side script which is configured to be installed on a client-side application. The client-side script gathers information associated with the network-accessible site in response to access of the network-accessible site via the client-side application. The information associated with the network-accessible site includes content published on the network-accessible site and user behavior data associated with access of the network-accessible site. Based on the information gathered using the client-side script, the third party service provider can provide users with one or more services.

9 Claims, 3 Drawing Sheets

METHOD FOR PROVIDING A THIRD PARTY SERVICE ASSOCIATED WITH A NETWORK-ACCESSIBLE SITE USING A SINGLE SCRIPTING APPROACH

RELATED APPLICATIONS

This patent application claims the benefit of priority to U.S. Provisional Patent Application No. 61/866,559 to Valvanne et al., filed Aug. 16, 2013 and incorporated herein by reference in its entirety.

FIELD OF THE INVENTION

The invention generally relates to sharing information related to network-accessible sites with third party service providers. More specifically, the invention relates to computer implemented services for providing a third party service associated with a network-accessible site using a single scripting approach.

BACKGROUND OF THE INVENTION

Currently, many network-accessible sites such as web sites utilize third party services to add functionalities to web sites. The functionalities added to the web sites can be web site analytics, discussion boards and social media plug-ins. Third party scripts are generally included into HyperText Markup Language (HTML) codes of a web site for providing the third party services on the web site. The third party scripts capture user behavior data to provide behavior-driven information such as product recommendations to users. However, the third party scripts may not capture details associated with the content published on the web site. Without knowledge of the content published on the web site, the third party service provider may not be able to provide appropriate recommendations to the users.

There are some systems where the third party service provider can be reported with the content published on the web site and the user behavior data to generate appropriate recommendations on the web site. However, currently, an owner of the web site needs to implement two different interfaces, namely, a scripting interface and a data exchange interface. The scripting interface is required to capture the user behavior data from the web site. The data exchange interface is required to transfer the content published on the web site to the third party service provider. Generally, a back-end integration approach implements a direct integration between the web site and the third party service provider. Typically, a batch job is executed periodically to send the web site information to the third party service provider using a protocol such as a File Transfer Protocol (FTP). Thus, the owner of the web site is required to actively send the web site information to the third party service provider. Due to the back-end integration, the third party service provider may not receive real-time data between periodically executed integration. Additionally, the implementation of a system with the back-end integration is time consuming and expensive.

Therefore, there is a need for an improved method and system for gathering information about a network-accessible site and users of the network-accessible site.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Figure 1:
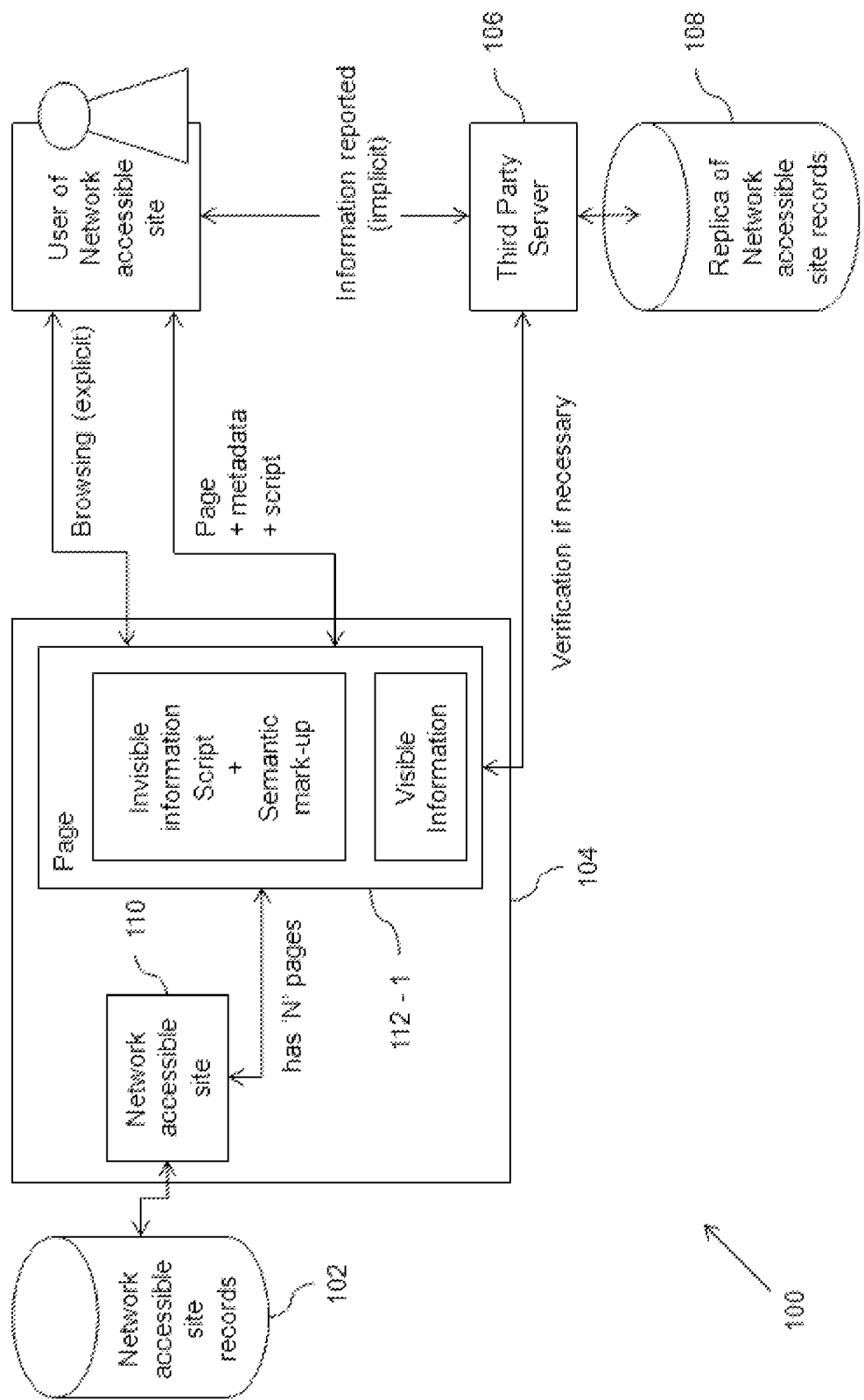
FIG. 1 illustrates a block diagram of a system for providing a third party service associated with a network-accessible site in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components for providing a third party service associated with a network-accessible site using a single scripting approach. Accordingly, the method steps and system components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, the terms "comprises," "comprising," or any other variation thereof, are intended to cover a non-exclusive inclusion, such that a process, method, article, or apparatus that comprises a list of objects does not include only those objects but may include other objects not expressly listed or inherent to such process, method, article, or apparatus. An object proceeded by "comprises . . . a" does not, without more constraints, preclude the existence of additional identical objects in the process, method, article, or apparatus that comprises the object.

Various embodiments of the invention provide a method for providing a third party service associated with a network-accessible site. The method includes automatically transferring information associated with a network-accessible site using a single scripting approach to a third party service provider. In accordance with the various embodiments, the term "network-accessible site" refers to a site which is accessible via a network through addresses known as Uniform Resource locators (URL). The network can be one of, but not limited to, internet, intranet, Local Area Network (LAN), Wireless Local Area Network (WLAN), Wireless Wide Area Network (WWAN), Wireless Metropolitan Area Network (WMAN), Wide Area Network (WAN) and telecommunication network. The network-accessible site can be accessed using a client device such as, but not limited to, computers, laptops, phones, tablets, handheld devices, television, portal digital devices and other media accessible devices.

In accordance with the various embodiments, the method includes providing a client-side script which is configured to be installed on a client-side application. The client-side script can be a script such as, but not limited to, a JavaScript®, a Visual Basic script (VBScript®), Ecmascript®, Dart®, Flash®, Silverlight®, Native Client modules, Java® and script of any other language which can be implemented on the client-side application to achieve the desired objective. Further, the client-side script can be implemented as a plug-in which can be installed in the client-side application. The client-side application can be an application such as, but not limited to, a browser and a mobile phone application.

In accordance with the various embodiments, the client-side script gathers information associated with the network-accessible site in response to access of the network-accessible site via the client-side application. The information associated with the network-accessible site includes content published on the network-accessible site and user behavior data associated with access of the network-accessible site. The information is gathered in response to access of the network-accessible site via the client-side application. Based on the information gathered using the client-side script, the third party service provider can provide users with one or more services such as, but not limited to, recommendations, advertisements, product related information, discount offers and coupons.

Referring to the figures and in particular FIG. 1, wherein a block diagram of a system 100 for providing a third party service associated with a network-accessible site is illustrated in accordance with various embodiments of the invention. As illustrated, system 100 includes a record database such as a network-accessible site records database 102, a client-side application 104, a third party server 106 and a third party database 108.

Network-accessible site records database 102 is configured to store network-accessible site information of one or more network-accessible sites. The network-accessible site information includes information such as, but not limited to, content published on the network-accessible site, information about different pages of the network-accessible site and URL of the network-accessible site. The published content can be one or more of, but not limited to, text, image, video or other media content.

As illustrated, client-side application 104 is configured to allow access to one or more network-accessible sites such as a network-accessible site 110. Client-side application 104 can be a browser including the client-side script (not illustrated in FIG. 1). The client-side script is configured to be installed on client side application 104. The client-side script can be a browser plug-in, which can be installed on client-side application 104. The client-side script is configured to gather information associated with the one or more network-accessible sites. The information associated with the one or more network-accessible sites includes the network-accessible information and user behavior data. The user behavior data can include one or more of, but not limited to, keywords used for searching, products viewed, products added in a shopping cart and products purchased. The client-side script is configured to gather the information associated with the one or more network-accessible sites when a user accesses the one or more network-accessible sites. The client-side script transfers the gathered information to third party server 106.

The one or more network-accessible sites such as network-accessible site 110 are configured to allow users to browse through the published content using client-side application 104. As illustrated, network-accessible site 110 can include one or more pages such as 112-1. Each page such as 112-1 as shown in FIG. 1, of the one or more pages can include an invisible information script and visible information. The invisible information scripts can include semantically marked parts of the published content. The semantic markup presents structured records without affecting visual representation of network-accessible site 110 and pages 112-n. The semantic mark up of the published content enables the client-side script to transfer structured information to third party server 106. For example, the information sent to third party server 106 can be one or more of, but not limited to, product items, purchase orders and articles. In an embodiment, the one or more pages include only the visible information. In accordance with the embodiment, the client-side script gathers the visible information and transfers the visible information to third party server 106.

Third party server 106 is configured to provide content and behavior based services to users based on information collected from the users. Third party server 106 is configured to receive information associated with the one or more network-accessible sites from the client-side script. Third party server 106 is configured to provide appropriate services to a user based on information received from client-side script. The appropriate services can be related to providing one or more of, but not limited to, behavior driven information, recommendations, advertisements, offers and any other third party services to the user.

There can be a plurality of instances of client-side application 104 on a plurality of client devices. The plurality of instances can transfer information associated with a plurality of network-accessible sites. The transferred information can include information associated with content published on the plurality of network-accessible sites and user behavior data of a plurality of users associated with the plurality of network-accessible sites. Third party server 106 can accordingly be configured to receive the information associated with the plurality of network-accessible sites for providing appropriate services to one or more of the plurality of users.

Third party server 106 is also configured to verify the accuracy of information received from a user of client-side application 104. Third party sever 106 can include an anti-fraud module (not illustrated in FIG. 1) to prevent third party server 106 from receiving false information such as the information received from malicious users. The anti-fraud module can be configured to perform one or more functions such as, but not limited to, utilizing statistical methods to find correct information against the information gathered from multiple users, using past behavior of a user to rank trustworthiness of the user, verifying the content published on the one or more network-accessible sites by mimicking client-side application 104 to fetch the information from the one or more network-accessible sites using a crawler. For instance, if the anti-fraud module is configured to utilize the statistical methods for finding correct information, then the anti-fraud module compares different versions of information received by the one or more users and chooses the most popular version. Taking another instance, if the anti-fraud module is configured to monitor the rate and distribution of information over Internet Protocol (IP) addresses of users, and identifiers of browser, user-agent and cookies, then the anti-fraud module can identify non-human malicious events.

Third party database 108 is also configured to create and store a replica of the network-accessible site information. Third party database 108 is configured to store the replica of the network-accessible site information stored in network-accessible site records database 102. The network-accessible site information is present in the information transferred from the plurality of instances of client-side application 104 to third party server 106. Further, the data stored in third party database 108 is updated when third party server 106 receives information from the plurality of instances of client-side application 104. Third party database 108 is also updated when third party server 106 analyzes the received information, wherein the analysis can be performed during fraud detection. The data stored in third party database 108 is utilized by third party server 106 to provide the appropriate services to users.

Figure 2:
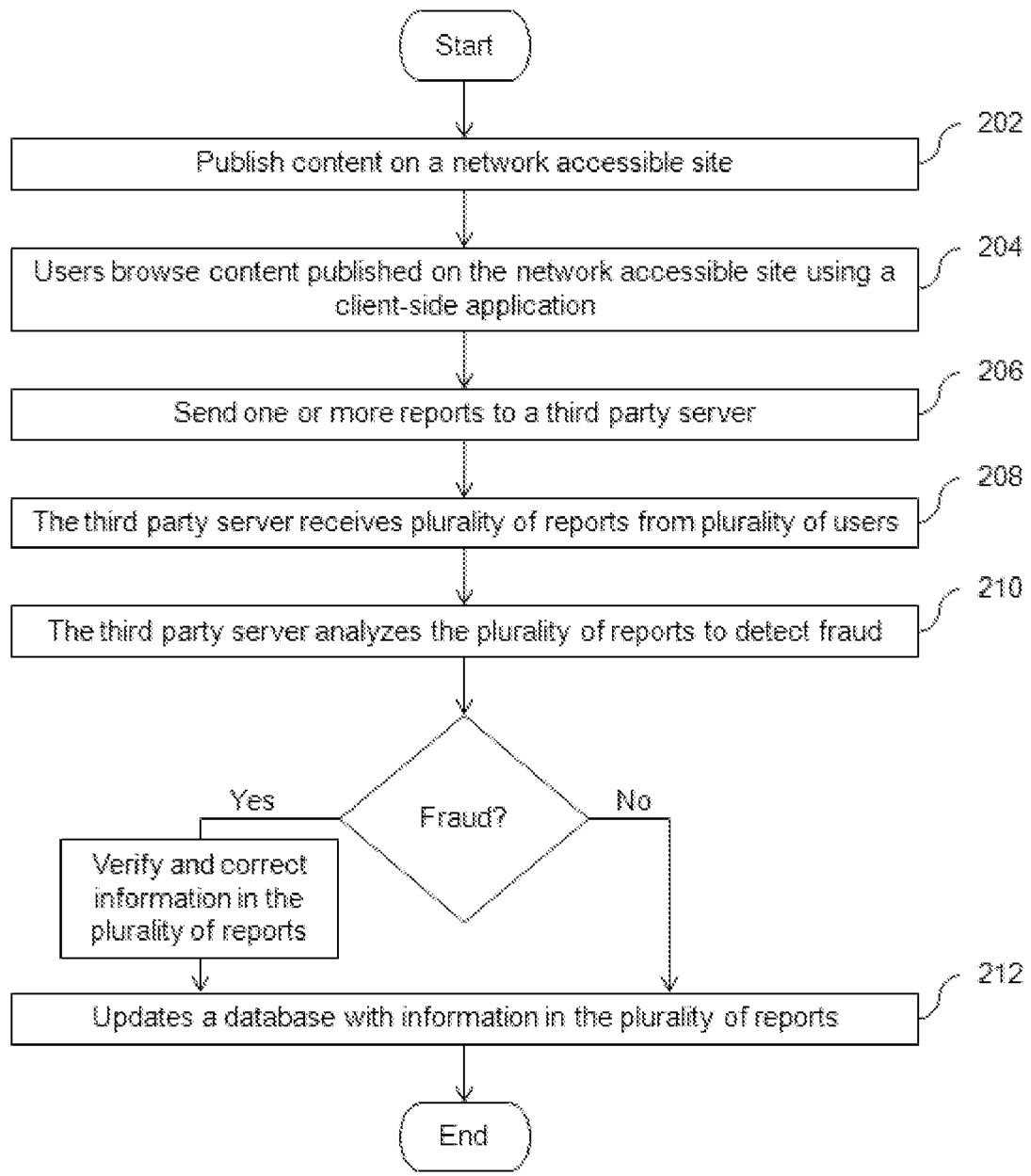
FIG. 2 illustrates a flowchart of a method for transferring network-accessible site and user behavior data using a single scripting approach in accordance with various embodiments of the invention.

Turning to FIG. 2, which illustrates a flowchart of a method transferring network-accessible site and user behavior data using a single scripting approach in accordance with various embodiments of the invention.

At 202, a network-accessible site owner publishes information on a network-accessible site such as network-accessible site 110. The information can be text, image, video or other media content. At 204, a user browses the network-accessible site using a client-side application such as client-side application 104, wherein browsing includes performing one or more of, but not limited to, visiting, interacting and performing actions on the network-accessible site. When the user browses the network-accessible site, one or more reports are generated, wherein the one or more reports include information published on the network-accessible site and user behavior data. Thereafter, at 206, the one or more reports are automatically sent to a third party server such as third party server 106. The third party server can receive a plurality of reports corresponding to a plurality of users. At 208, the third party server receives the plurality of reports from the plurality of users.

At 210, the third party server analyzes the plurality of reports to detect any fraud by identifying false information from malicious users. The third party server can detect fraud using the anti-fraud module. If there is no fraud, the third party server updates a database such as third party database 108 with the information in the plurality of reports at 212. If fraud is detected, the third party server verifies and corrects the information before updating the database.

Figure 3:
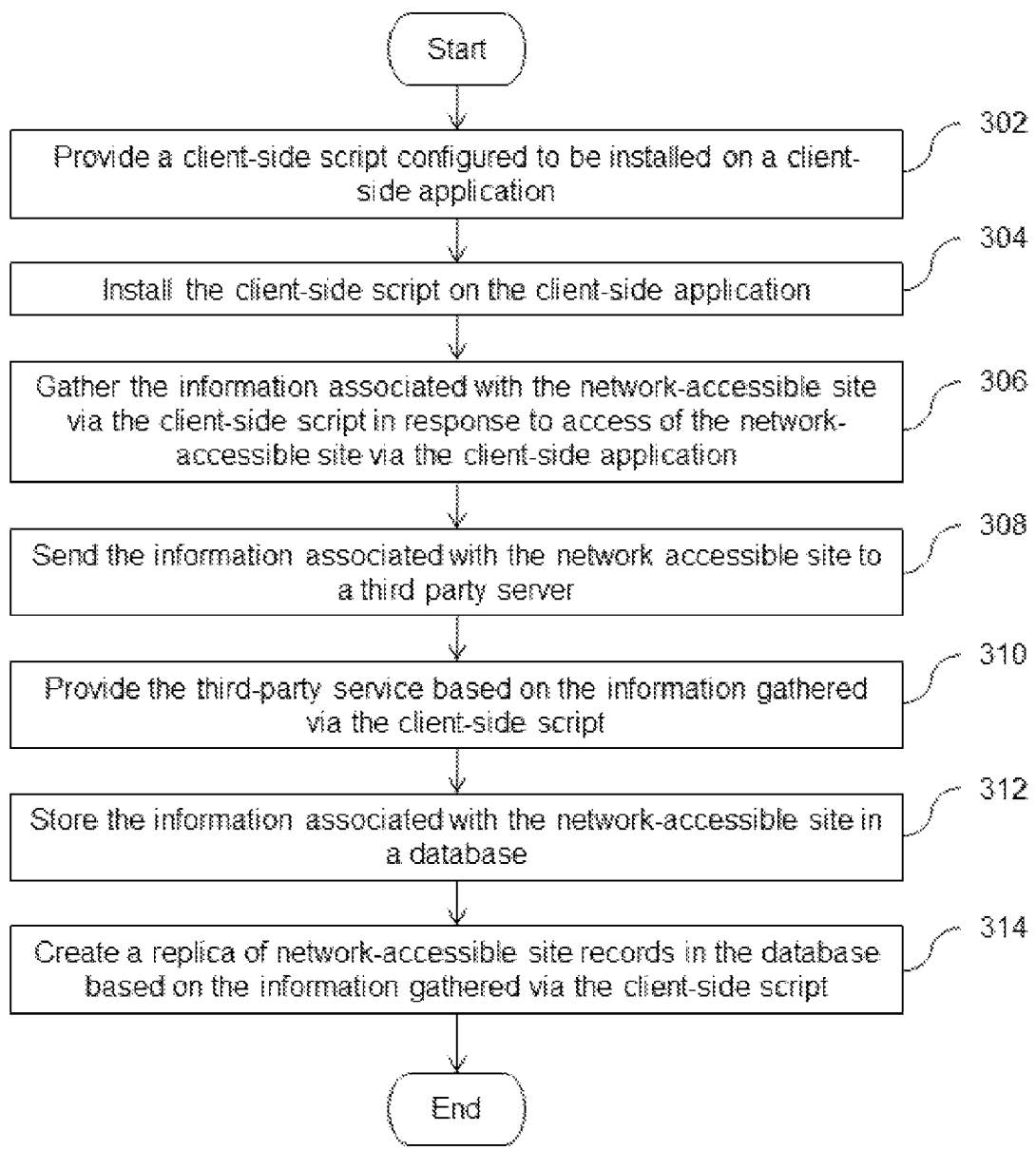
FIG. 3 illustrates a flowchart of a method for providing a third party service associated with a network-accessible site in accordance with various embodiments of the invention.

Turning to FIG. 3, which illustrates a flowchart of a method for providing a third party service associated with a network-accessible site in accordance with various embodiments of the invention.

At 302, a client-side script is provided which is configured to be installed on a client-side application such as client-side application 104. In accordance with the various embodiments, the client-side script is configured to gather information associated with the network-accessible site in response to access of the network-accessible site via the client-side application.

At 304, the client-side script is installed on the client-side application. At 306, the information associated with the network-accessible site is gathered via the client-side script in response to access of the network-accessible site via the client-side application. For example, when a user accesses a web site using a web browser, content such as text and image published on the website is gathered by the client-side script.

At 308, the information associated with the network-accessible site is transferred to a third party server. At 310, the third-party service is provided to users based on the information gathered via the client-side script.

Optionally, at 312, the information associated with the network-accessible site is stored in a database such as third party database 108. Optionally, at 314, a replica of network-accessible site records is created in the database based on the information gathered via the client-side script. The content published on the network-accessible site can include a structured data created using a semantic mark-up format. For example, products displayed on an e-store web site can be in a structured format and a semantic tag can be included for each product displayed on the e-store web site. In addition, the replica of the network-accessible site records can be updated when the content published on the network-accessible site is updated by an owner of the network-accessible site.

Consider a scenario where a user browses an e-commerce retail store web site using a browser. Further, consider that the browser includes a client-side script that implements the method disclosed herein for gathering information associated with one or more web sites. When the user browses the web site, the information published on the web site is reported to a third party server using the client-side script. Optionally, the third party server creates a replica of product catalogs on the e-commerce retail store based on the web site information reported by the client-side script. The client-side script also reports user behavior data along with the information published on the web site to the third party server. The third party server can gather information related to multiple web sites and multiple users via multiple client-side scripts. In accordance with the scenario, the third party server provides product recommendations to a user of the e-commerce retail store web site using the gathered information. The recommendations can be reported back to the e-commerce retail store web site. Alternatively, personalized emails are built which are triggered based on behaviors of the user on the e-commerce retail store web site. The personalized emails include relevant recommendations for the user. Further, the third party server can provide optimized advertisements on external web sites using the replica of product catalogs and user behavior data. The third party server can find relevant products for advertising based on the replica of product catalogs and the user behavior data. The third party server can also optimize the web site's search engine marketing (SEM) campaigns using the replica of product catalogs and the user behavior data. The web site's SEM campaigns can be optimized by identifying search terms used by various users to find products which are finally purchased by the users. Thereafter, campaigns can be created for the search terms using the actual product information from the replica of product catalog.

The disclosed method transfers information associated with a network-accessible site to a third party service provider using a single scripting approach. Thus, the disclosed method eliminates the requirement of a back-end integration between the network-accessible site and the third party service provider, thereby reducing costs and implementation time and enabling faster update of information to a third party service provider. Due to the single scripting approach, the information in a third party database is updated in near real-time. The combination of the active reporting of information from the network-accessible site, semantic marking of published content on the network-accessible site and the anti-fraud module provide the third party service a near real-time and accurate view of the content published on the network-accessible site. The third party service provider can reuse the network-accessible site information and the user behavior data stored in the third party database to provide various services to users such as, but not limited to, advertisements, rendering product related information and discount offers.

Those skilled in the art will realize that the above-recognized advantages and other advantages described herein are merely exemplary and are not meant to be a complete rendering of all of the advantages of the various embodiments of the invention.

In the foregoing specification, specific embodiments of the invention have been described. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for providing a third party service associated with a network-accessible site, the method comprising:
   providing a client-side application in communication with a third party server that is in communication with a third party database;
   installing a client-side script on the client-side application, the client-side script gathering information associated with a network-accessible site in response to access of the network accessible site via the client-side application, the gathered information associated with the network-accessible site comprising:
      structured content published on the network-accessible site in accordance with a semantic mark-up format and wherein the content published on the network-accessible site comprises structured data in accordance with the semantic mark-up format; and
      user behavior data associated with access of the network-accessible site via the client-side application;
   the client-side script gathering the information associated with the network-accessible site in response to access of the network-accessible site via the client-side application;
   the client-side script transferring the gathered information, containing the structured content and the user behavior data, to the third-party server;
   the third party server receiving the gathered information and providing the third-party service to the client-side application based on the gathered information received from the client-side script;
   the third-party server storing the gathered information in the third party database;
   the third party server creating a replica of the structured content in the third party database based on the gathered information; and
   the third party server dynamically updating the replica of the structured content based on updated information gathered by the client-side script.

2. The method of claim 1 further comprising verifying accuracy of the information gathered via the client-side script, wherein the verification is performed based on at least one of:
   accessing the network-accessible site from a server application;
   comparing information gathered from a plurality of client-side applications; and
   user behavior data gathered via the client-side script.

3. The method of claim 1, wherein the third party service comprises providing content based on the gathered information that is gathered via the client-side script, wherein the content is at least one of a recommendation and an advertisement.

4. The method of claim 1, wherein the client-side script is one of a JavaScript, a Visual Basic script (VBScript), Ecmascript, Dart, Flash, Silverlight, Native Client modules and Java.

5. The method of claim 1, wherein the client-side application is a browser.

6. The method of claim 1, wherein the client-side application is a mobile phone application.

7. A system for providing a third party service, the system comprising:
   a network-accessible site having a page, the page comprising visible information containing a structured content being visible on the network-accessible site and invisible information being invisible on the network-accessible site, the invisible information comprising user-behavior data and a semantic mark-up of the structured content;
   a client-side script installed on a client-side application;
   the client-side script being in communication with the network-accessible site to gather information associated with the network-accessible site in response to access of the network-accessible site via the client-side application;
   the gathered information gathered by the client-side script comprising:
      the structured content published on the network-accessible site; and
      the user behavior data associated with access of the network-accessible site;
   the third party server in communication with the client-side script receive the gathered information associated with the network-accessible site from the client-side script, the third party server in communication with the network-accessible site to provide third party service based on the gathered information received from the client-side script;
   the third party server being in communication with a third party database, the third party database comprising the user behavior data and a replica of the structured content published on the network-accessible site; and
   the third party server dynamically updating the replica of the structured content based on updated information gathered by the client-side script.

8. The system of claim 7, wherein the server further comprises an anti-fraud module to verify information received from the client-side script.

9. A method for using client-side activity to update a replica of an e-store website, the method comprising:
   providing a client-side application in communication with a third party server that is in communication with a third party database;
   installing a client-side script on the client-side application, the client-side script gathering information associated with an e-store website, that displays product information, in response to access of the e-store website via the client-side application,
   the gathered information associated with the network-accessible site comprising:
      product information published on the e-store website in accordance with a semantic tag for each product displayed on the e-store website, the product information comprising structured data in accordance with the semantic tag; and
      user behavior data associated with access of the e-store website via the client-side application;
   the client-side script transferring the gathered information, containing the product information and the user behavior data, to the third-party server;
   the third party server receiving the gathered information;
   the third-party server storing the gathered information in the third party database;

the third party server creating a replica of the product information published on the e-store website in the third party database based on the gathered information received from the client-side script; and the third party server dynamically updating the replica based on updated information gathered by the client-side script.

\* \* \* \* \*